(12) United States Patent
Harrington (10) Patent No.: US 10,536,494 B2
(45) Date of Patent: *Jan. 14, 2020

(54) ESTABLISHING A SOCIAL APPLICATION LAYER

(71) Applicant: Electronic Arts Inc., Redwood City, CA (US)

(72) Inventor: Clifford J. Harrington, San Francisco, CA (US)

(73) Assignee: Electronic Arts Inc., Redwood City, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 15/841,559

(22) Filed: Dec. 14, 2017

(65) Prior Publication Data
US 2018/0109572 A1 Apr. 19, 2018

Related U.S. Application Data

(63) Continuation of application No. 15/422,267, filed on Feb. 1, 2017, now Pat. No. 9,871,837, which is a
(Continued)

(51) Int. Cl.
*G06F 3/00* (2006.01)
*G06F 9/44* (2018.01)
(Continued)

(52) U.S. Cl.
CPC ........ *H04L 65/403* (2013.01); *G06F 9/45533* (2013.01); *G06F 16/9024* (2019.01);
(Continued)

(58) Field of Classification Search
CPC .................................................... H04L 65/403
(Continued)

(56) References Cited

U.S. PATENT DOCUMENTS 6,951,516 B1 10/2005 Eguchi
7,056,217 B1 6/2006 Pelkey
(Continued)

FOREIGN PATENT DOCUMENTS

AU 2012355385 11/2015
CN 101715586 5/2010
(Continued)

OTHER PUBLICATIONS

Johnston, Ken. VSCpr for GREE, Inc. "GREE Gaming Platform Provides Global User Base for All Developers. New Platform Offers Unified Social Gaming System" Burlingame, CA, PRWeb, Dec. 5, 2011, 2 pages.
(Continued)

*Primary Examiner* — Timothy A Mudrick
(74) *Attorney, Agent, or Firm* — Knobbe Martens Olson & Bear, LLP (57) ABSTRACT

A virtual space may be presented within a plurality of virtual environments provided by different platforms without requiring idiosyncratic APIs associated with the virtual space for each different platform. An API adaptor module may be configured to facilitate interfacing between a single virtual space API and platform APIs associated with two or more different platforms. A space module may be configured to execute an instance of a virtual space, and to implement the instance of the virtual space to determine view information defining views of the instance of the virtual space for presentation via two or more virtual environments provided by the two or more platforms. Facilitating user interactivity with the virtual space via a given virtual environment provided by a given platform may include interfacing between the virtual space API and a platform API associated with the given platform.

18 Claims, 2 Drawing Sheets

Related U.S. Application Data continuation of application No. 14/814,375, filed on Jul. 30, 2015, now Pat. No. 9,596,277, and a continuation of application No. 14/505,470, filed on Oct. 2, 2014, now Pat. No. 9,116,732, and a continuation of application No. 13/464,190, filed on May 4, 2012, now Pat. No. 8,881,181.

(51) Int. Cl.

| | | |
|---|---|---|
| G06F 9/46 | (2006.01) | |
| G06F 13/00 | (2006.01) | |
| H04L 29/06 | (2006.01) | |
| G06F 16/901 | (2019.01) | |
| G06F 9/455 | (2018.01) | |
| H04L 12/58 | (2006.01) | |
| H04L 29/08 | (2006.01) | |

(52) U.S. Cl.
CPC .............. *H04L 51/32* (2013.01); *H04L 67/02* (2013.01); *H04L 67/42* (2013.01)

(58) Field of Classification Search
USPC ........................................................ 719/328
See application file for complete search history.

(56) References Cited

U.S. PATENT DOCUMENTS

| | | | |
|---|---|---|---|
| 7,522,058 | B1 | 4/2009 | Light |
| 7,707,122 | B2 | 4/2010 | Hull |
| 7,780,530 | B2 | 8/2010 | Ushiro |
| 7,856,471 | B2 | 12/2010 | Pounds |
| 7,970,712 | B2 | 6/2011 | Ruvolo |
| 8,137,193 | B1 | 3/2012 | Kelly |
| 8,137,194 | B1 | 3/2012 | Kelly |
| 8,214,487 | B2 | 7/2012 | Savoor |
| 8,257,174 | B2 | 9/2012 | Pincus |
| 8,332,488 | B1 | 12/2012 | Dale |
| 8,347,225 | B2 | 1/2013 | Blinnikka |
| 8,347,322 | B1 | 1/2013 | Brown |
| 8,353,760 | B2 | 1/2013 | Ocko |
| 8,622,828 | B1 | 1/2014 | Harrington |
| 8,663,004 | B1 | 3/2014 | Xu |
| 8,734,243 | B2 | 5/2014 | Harrington |
| 8,843,557 | B2 | 9/2014 | Ranade |
| 8,868,655 | B2 | 10/2014 | Ranade |
| 8,881,181 | B1 | 11/2014 | Harrington |
| 8,984,541 | B1 | 3/2015 | Brown |
| 8,986,116 | B1 | 3/2015 | Harrington |
| 9,011,242 | B2 | 4/2015 | Xu |
| 9,116,732 | B1 | 8/2015 | Harrington |
| 9,223,599 | B1 | 12/2015 | Racanelli |
| 9,450,900 | B1 | 9/2016 | Ranade |
| 9,452,356 | B1 | 9/2016 | Tsao |
| 9,569,801 | B1 | 2/2017 | Xu |
| 9,578,094 | B1 | 2/2017 | Ranade |
| 9,596,277 | B1 | 3/2017 | Harrington |
| 9,656,179 | B1 | 5/2017 | Xu |
| 9,871,837 | B1 | 1/2018 | Harrington |
| 2003/0078960 | A1 | 4/2003 | Murren |
| 2003/0177187 | A1 | 9/2003 | Levine |
| 2004/0117386 | A1 | 6/2004 | Lavender |
| 2005/0245317 | A1 | 11/2005 | Arthur |
| 2005/0272504 | A1 | 12/2005 | Eguchi |
| 2006/0121986 | A1 | 6/2006 | Pelkey |
| 2006/0287099 | A1 | 12/2006 | Shaw |
| 2007/0150603 | A1 | 6/2007 | Crull |
| 2007/0173324 | A1 | 7/2007 | Multerer |
| 2007/0233736 | A1 | 10/2007 | Xiong |
| 2007/0274460 | A1 | 11/2007 | Shaffer |
| 2008/0119277 | A1 | 5/2008 | Thelen |
| 2008/0134035 | A1 | 6/2008 | Pennington |
| 2008/0187143 | A1 | 8/2008 | Mak-Fan |
| 2009/0034696 | A1 | 2/2009 | Ramanathan |
| 2009/0112989 | A1 | 4/2009 | Anderson |
| 2009/0144075 | A1 | 6/2009 | Flinn |
| 2009/0172795 | A1 | 7/2009 | Ritari |
| 2009/0197681 | A1 | 8/2009 | Krishnamoorthy |
| 2009/0197881 | A1 | 8/2009 | Kugimiya |
| 2009/0199275 | A1 | 8/2009 | Brock |
| 2009/0292814 | A1 | 11/2009 | Ting |
| 2009/0325712 | A1 | 12/2009 | Rance |
| 2009/0327232 | A1 | 12/2009 | Carter |
| 2009/0327427 | A1 | 12/2009 | Mathew |
| 2009/0327882 | A1 | 12/2009 | Velusamy |
| 2010/0024015 | A1 | 1/2010 | Hardt |
| 2010/0063969 | A1 | 3/2010 | Kasargod |
| 2010/0106782 | A1 | 4/2010 | Huang |
| 2010/0146118 | A1 | 6/2010 | Wie |
| 2010/0169798 | A1 | 7/2010 | Hyndman |
| 2010/0197409 | A1 | 8/2010 | Van Luchene |
| 2010/0216553 | A1 | 8/2010 | Chudley |
| 2010/0228617 | A1 | 9/2010 | Ransom |
| 2010/0229106 | A1 | 9/2010 | Lee |
| 2010/0235754 | A1 | 9/2010 | Leitheiser |
| 2010/0274815 | A1 | 10/2010 | Vanasco |
| 2010/0304862 | A1 | 12/2010 | Coleman |
| 2010/0312820 | A1 | 12/2010 | Goffinet |
| 2011/0014972 | A1 | 1/2011 | Herrmann |
| 2011/0016488 | A1 | 1/2011 | Athias |
| 2011/0022450 | A1 | 1/2011 | Meredith |
| 2011/0023101 | A1 | 1/2011 | Vernal |
| 2011/0107239 | A1 | 5/2011 | Adoni |
| 2011/0131508 | A1 | 6/2011 | Gershfang |
| 2011/0151976 | A1 | 6/2011 | Holloway |
| 2011/0179161 | A1 | 7/2011 | Guy |
| 2011/0202605 | A1 | 8/2011 | Shochet |
| 2011/0212783 | A1 | 9/2011 | Dale |
| 2011/0216553 | A1 | 9/2011 | Lee et al. |
| 2011/0224000 | A1 | 9/2011 | Toga |
| 2011/0237335 | A1 | 9/2011 | Holloway |
| 2011/0238608 | A1 | 9/2011 | Sathish |
| 2011/0250949 | A1 | 10/2011 | Van Os |
| 2011/0251970 | A1 | 10/2011 | Oien |
| 2011/0269548 | A1 | 11/2011 | Barclay |
| 2011/0295626 | A1 | 12/2011 | Chen |
| 2012/0015739 | A1 | 1/2012 | Craine |
| 2012/0047008 | A1 | 2/2012 | Alhadeff |
| 2012/0054646 | A1 | 3/2012 | Hoomani |
| 2012/0060103 | A1 | 3/2012 | Arasaki |
| 2012/0077523 | A1 | 3/2012 | Roumeliotis |
| 2012/0094766 | A1 | 4/2012 | Reynolds |
| 2012/0124147 | A1 | 5/2012 | Hamlin |
| 2012/0142429 | A1 | 6/2012 | Muller |
| 2012/0202587 | A1 | 8/2012 | Allen |
| 2012/0227086 | A1 | 9/2012 | Dale |
| 2012/0227087 | A1 | 9/2012 | Brown |
| 2012/0244948 | A1 | 9/2012 | Dhillon |
| 2012/0252579 | A1 | 10/2012 | Sethi |
| 2012/0254903 | A1 | 10/2012 | Brown |
| 2012/0290949 | A1 | 11/2012 | Elenzil |
| 2012/0290950 | A1 | 11/2012 | Rapaport |
| 2012/0324001 | A1 | 12/2012 | Leacock |
| 2013/0005476 | A1 | 1/2013 | Keswani |
| 2013/0006736 | A1 | 1/2013 | Bethke |
| 2013/0014033 | A1 | 1/2013 | Hamick |
| 2013/0031171 | A1 | 1/2013 | Serena |
| 2013/0073400 | A1 | 3/2013 | Heath |
| 2013/0090170 | A1 | 4/2013 | Reed |
| 2013/0091204 | A1 | 4/2013 | Loh |
| 2013/0091221 | A1 | 4/2013 | Bennett |
| 2013/0143669 | A1 | 6/2013 | Muller |
| 2013/0151603 | A1 | 6/2013 | Lobb |
| 2013/0151604 | A1 | 6/2013 | Ranade |
| 2013/0159430 | A1 | 6/2013 | Ranade |
| 2013/0165234 | A1 | 6/2013 | Hall |
| 2013/0172085 | A1 | 7/2013 | Harrington |
| 2013/0198275 | A1 | 8/2013 | Forsblom |
| 2013/0212191 | A1 | 8/2013 | Suraj |
| 2013/0282828 | A1 | 10/2013 | Lawler |
| 2013/0326368 | A1 | 12/2013 | Voas |
| 2013/0332825 | A1 | 12/2013 | Singh |

(56) References Cited

U.S. PATENT DOCUMENTS

| | | |
|---|---|---|
| 2014/0179434 A1 | 6/2014 | Xu |
| 2014/0187333 A1 | 7/2014 | Craine |
| 2015/0005052 A1 | 1/2015 | Harrington |

FOREIGN PATENT DOCUMENTS

| | | |
|---|---|---|
| CN | 102185789 | 9/2011 |
| CN | 104168968 | 11/2014 |
| CN | 104169963 | 5/2018 |
| EP | 2383683 A1 | 11/2011 |
| EP | 2 794 041 | 10/2014 |
| WO | 2008144412 | 1/2008 |
| WO | 101635641 | 1/2010 |
| WO | 2010025343 | 1/2010 |
| WO | 2013086268 | 6/2013 |
| WO | 2013086268 A1 | 6/2013 |
| WO | 2013096261 | 6/2013 |
| WO | 2013096261 A1 | 6/2013 |
| WO | 2013103655 | 7/2013 |
| WO | 2013103655 A1 | 7/2013 |

OTHER PUBLICATIONS

"Buddy Rush:: The World's Best Cross-platform RPG!", http://buddyrush.sollmo.com/, printed Nov. 28, 2011, copyright 2011 by Team Sollmo with Company 11, Inc., 2 pages.

"FriendFeed", definition from Wikipedia, the free encyclopedia, printed Nov. 28, 2011, 3 pages.

Hendrickson, Mark, "Watch Out FriendFeed: Socialthing! Is Even Easier to Use", http://techcrunch.com/2008/03/10/watch-out-friendfeed-socialthing-is-even-easier-to-use/, posted Mar. 10, 2008, 4 pages.

Hendrickson, Mark, "Watch Out FriendFeed: Socialthing! is Even Easier to Use", http://techcrunch.com/2008/03/10/watch-out-friendfeed-socialthing-is-even-easier-to-use/, posted Mar. 10, 2008, printed Nov. 28, 2011, 2 pages.

Webster, Andrew, "Social games need to become truly cross-platform", http://www.gamezebo.com/news/2011/06/08/social-games-need-become-truly-cross-platform, posted Jun. 8, 2011, printed Nov. 28, 2011, 2 pages.

ESTABLISHING A SOCIAL APPLICATION LAYER

FIELD OF THE DISCLOSURE

This disclosure relates to facilitating presentation of a virtual space within a plurality of virtual environments provided by different platforms without requiring idiosyncratic APIs associated with the virtual space for each different platform.

BACKGROUND

Presenting a virtual space within a virtual environment is known. Typically, however, a provider of the virtual space may be required to provide a separate application programming interface (API) for each different virtual environment in which the virtual space is presented. Thus, a change to the virtual space may require corresponding changes to each of the separate APIs.

SUMMARY

One aspect of the disclosure relates to a system configured to facilitate presentation of a virtual space within a plurality of virtual environments provided by different platforms without requiring idiosyncratic APIs associated with the virtual space for each different platform, in accordance with one or more implementations. In exemplary implementations, an API adaptor module may be configured to facilitate interfacing between a single virtual space API and platform APIs associated with two or more different platforms. There may be separate API adaptor modules or sub-modules corresponding to individual ones of the different platforms. The API adaptor module may serve as a converter between the virtual space API and various platform APIs such that a single version of the virtual space may be presented in virtual environments provided by any of the different platforms. Thus, a change to the virtual space may not necessitate corresponding changes to a plurality of virtual space APIs. Some implementations may ensure that the virtual space is displayed correctly within different virtual environments. Some implementations may facilitate accessing social graph information associated with individual virtual environments via the virtual space, interacting with platform mechanics of individual virtual environments via the virtual space, and/or transferring publishing information between the virtual space and individual virtual environments.

In some implementations, system may include one or more of one or more platform servers, one or more space servers, and/or other components. The platform server(s) may be configured to communicate with one or more client computing platforms according to a client/server architecture to provide virtual environments to users via client computing platform(s). The space server(s) may be configured to interface with individual platform server(s) to supplement the functionality provided to the users with respect to the virtual environments. For example, space server(s) may interface with individual platform server(s) via one or more APIs.

The space server(s) may be configured to execute one or more computer program modules. The computer program modules may include one or more of an API adaptor module, a space module, a social graph access module, a platform mechanics module, a platform publishing module, and/or other modules.

The API adaptor module may be configured to facilitate interfacing between a single virtual space API and platform APIs associated with two or more different platforms. Generally speaking, an API may be viewed as a set of routines and/or services used by an application program to direct the performance of procedures by a host environment and/or host computing platform. Interfacing between two APIs (e.g., a virtual space API and a platform API) may include translating commands, calls, functions, and/or other information associated with APIs between the two APIs. The virtual space API may be associated with a virtual space provided by space module, as described further herein. The two or more different platforms may correspond to individual ones of the platform server(s). A given platform server may be associated with a specific platform API. The API adaptor module may be configured to facilitate proper display of the virtual space within virtual environments provided the platform server(s). In some implementations, the API adaptor module may include two or more sub-modules each corresponding to individual platforms.

The space module may be configured to implement at least one instance of the virtual space to determine views of the virtual space. The views may then be communicated (e.g., via streaming, via object/position data, and/or other information) from the platform server(s) to the client computing platform(s) for presentation to users via two or more virtual environments provided by the platform server(s). Facilitating user interactivity with the virtual space via a given virtual environment provided by a given platform may include interfacing between the virtual space API and the platform API associated with the given platform. User interactivity may include accessing social graph information associated with individual virtual environments via the virtual space, interacting with platform mechanics of individual virtual environments via the virtual space, transferring publishing information between the virtual space and individual virtual environments, and/or other interactions by a user with the virtual space.

The social graph access module may be configured to facilitate accessing social graph information associated with individual virtual environments provided by the platform server(s). The social graph information may be accessed via the virtual space provided by the space module. Generally speaking, a social graph may be viewed as a mapping of relationships (e.g., personal, professional, familial, and/or other relationships) between users associated directly and/or indirectly with a given virtual environment. According to some implementations, social graph information associated with a given virtual environment may include one or more of friends, contacts, relationship type, relationship duration, relationships in common, and/or other information included in a social graph of the given virtual environment. Social graph information associated with a given virtual environment may be used within the virtual environment provided by the space module. Accessing social graph information associated with a given virtual environment may include interfacing between the virtual space API and the platform API associated with the platform providing the given virtual environment.

The platform mechanics module may be configured to facilitate interacting with platform mechanics associated with individual virtual environments provided by the platform server(s). The platform mechanics may be interacted with via the virtual space provided by the space module. Platform mechanics may be viewed generally as constructs of rules and/or functions of a virtual environment. In some implementations, platform mechanics associated with a given virtual environment may include one or more of invitations, requests, alerts, gifts, events, and/or other mechanics of the given virtual environment. Platform mechanics associated with a given virtual environment may be used within the virtual environment provided by the space module. Interacting with platform mechanics associated with a given virtual environment may include interfacing between the virtual space API and the platform API associated with the platform providing the given virtual environment.

The platform publishing module may be configured to facilitate transferring publishing information between the virtual space and individual virtual environments provided by the platform server(s). Publishing information may be viewed as information provided by a user that persists within the virtual environment and is viewable and/or otherwise accessible by one or more users. In accordance with some implementations, publishing information associated with a given virtual environment provided by a given platform may include one or more of textual messages, emails, voice-based communications, video-based communications, wall posts, and/or other publishing information. Publishing information associated with a given virtual environment may be used within the virtual environment provided by the space module. Transferring publishing information between the virtual space and a given virtual environment may include interfacing between the virtual space API and the platform API associated with the platform providing the given virtual environment.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
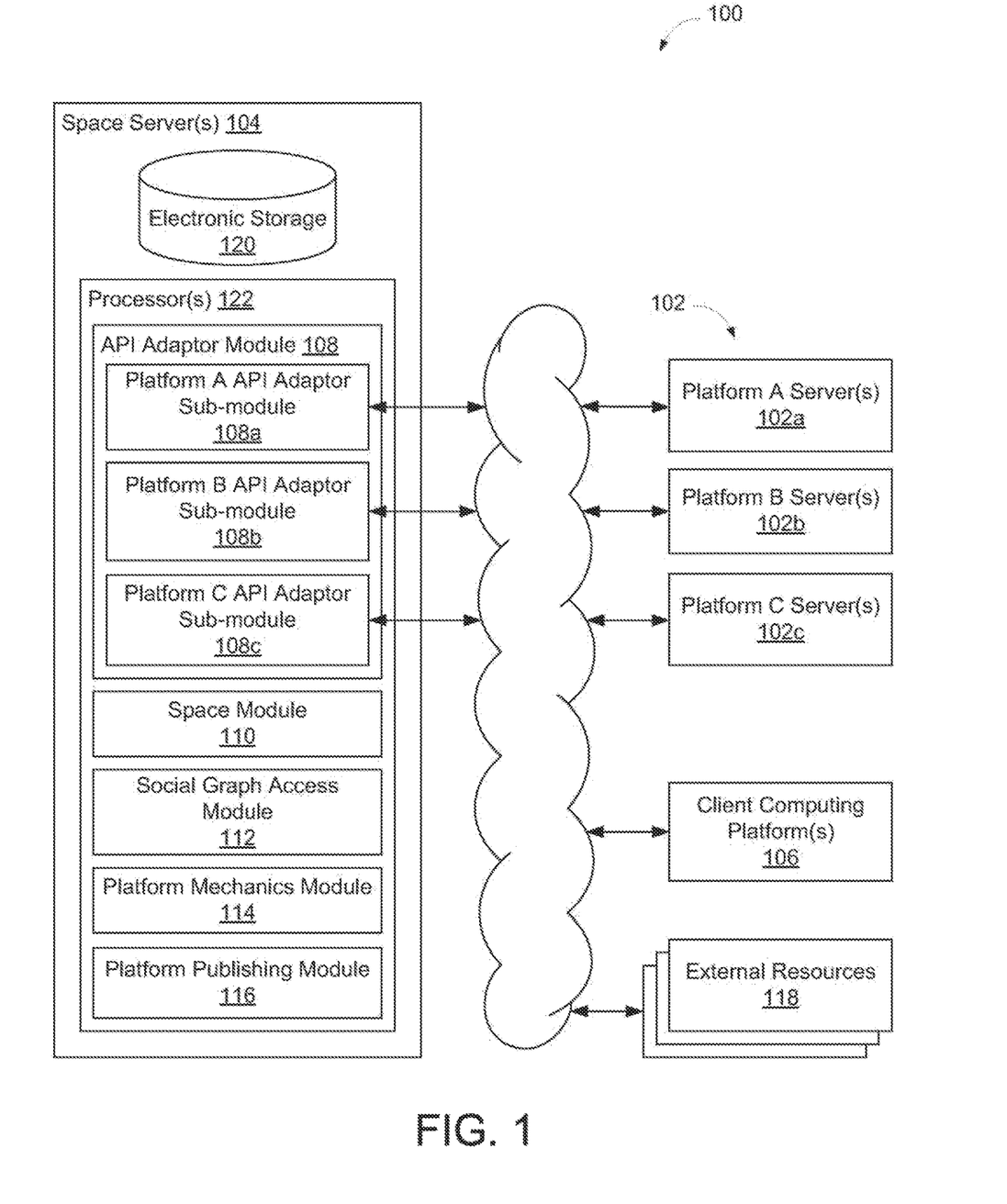
FIG. 1 illustrates a system configured to facilitate presentation of a virtual space within a plurality of virtual environments provided by different platforms without requiring idiosyncratic APIs associated with the virtual space for each different platform, in accordance with one or more implementations.

FIG. 1 illustrates a system 100 configured to facilitate presentation of a virtual space within a plurality of virtual environments provided by different platforms without requiring idiosyncratic APIs associated with the virtual space for each different platform, in accordance with one or more implementations. In exemplary implementations, an API adaptor module may be configured to facilitate interfacing between a single virtual space API and platform APIs associated with two or more different platforms. There may be separate API adaptor modules or sub-modules corresponding to individual ones of the different platforms. The API adaptor module may serve as a converter between the virtual space API and various platform APIs such that a single version of the virtual space may be presented in virtual environments provided by any of the different platforms. Thus, a change to the virtual space may not necessitate corresponding changes to a plurality of virtual space APIs. Some implementations may ensure that the virtual space is displayed correctly within different virtual environments. Some implementations may facilitate accessing social graph information associated with individual virtual environments via the virtual space, interacting with platform mechanics of individual virtual environments via the virtual space, and/or transferring publishing information between the virtual space and individual virtual environments.

In some implementations, system 100 may include one or more of one or more platform servers 102 (e.g., platform A server(s) 102a, platform B server(s) 102b, platform C server(s) 102c, and/or other platform servers), one or more space servers 104, and/or other components. The platform server(s) 102 may be configured to communicate with one or more client computing platforms 106 according to a client/server architecture to provide virtual environments to users via client computing platform(s) 106. The space server(s) 104 may be configured to interface with individual platform server(s) 102 to supplement the functionality provided to the users with respect to the virtual environments. For example, space server(s) 104 may interface with individual platform server(s) 102 via one or more APIs.

The space server(s) 104 may be configured to execute one or more computer program modules. The computer program modules may include one or more of an API adaptor module 108, a space module 110, a social graph access module 112, a platform mechanics module 114, a platform publishing module 116, and/or other modules.

The API adaptor module 108 may be configured to facilitate interfacing between a single virtual space API and platform APIs associated with two or more different platforms. Generally speaking, an API may be viewed as a set of routines and/or services used by an application program to direct the performance of procedures by a host environment and/or host computing platform. Interfacing between two APIs (e.g., a virtual space API and a platform API) may include translating commands, calls, functions, and/or other information associated with APIs between the two APIs. The virtual space API may be associated with a virtual space provided by space module 110, as described further herein. The two or more different platforms may correspond to platform server(s) 102. As depicted in FIG. 1, platform A server(s) 102a may be associated with a specific API, for example, platform A API. Similarly, platform B server(s) 102b and platform C server(s) 102c may be respectively associated with platform B API and platform C API. The API adaptor module 108 may be configured to facilitate proper display of the virtual space within virtual environments provided platform server(s) 102.

In some implementations, API adaptor module 108 may includes two or more sub-modules each corresponding to individual platforms. As depicted in FIG. 1, API adaptor module 108 may include platform A API sub-module 108a, platform B API sub-module 108b, platform C API sub-module 108c, and/or other sub-modules. The platform A API sub-module 108a may be configured to facilitate interfacing between a virtual space API and platform A API of platform A server(s) 102a. The platform B API sub-module 108b may be configured to facilitate interfacing between a virtual space API and platform B API of platform B server(s) 102b. The platform C API sub-module 108c may be configured to facilitate interfacing between a virtual space API and platform C API of platform C server(s) 102c.

The space module 110 may be configured to implement at least one instance of the virtual space to determine views of the virtual space. The views may then be communicated (e.g., via streaming, via object/position data, and/or other information) from platform server(s) 102 to client computing platform(s) 106 for presentation to users via two or more virtual environments provided by platform server(s) 102. Facilitating user interactivity with the virtual space via a given virtual environment provided by a given platform may include interfacing between the virtual space API and the platform API associated with the given platform. User interactivity may include accessing social graph information associated with individual virtual environments via the virtual space, interacting with platform mechanics of individual virtual environments via the virtual space, transferring publishing information between the virtual space and individual virtual environments, and/or other interactions by a user with the virtual space.

The view determined and transmitted to a given client computing platform 106 may correspond to a user character being controlled by a user via the given client computing platform 106. The view determined and transmitted to a given client computing platform 106 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platform(s) 106) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are determined by space module 110 is not intended to be limiting. The space module 110 may be configured to express the virtual space in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 110, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platform(s) 106. The users may interact with each other through communications exchanged within the virtual space. Such communications may include one or more of textual chat, instant messages, private messages, voice communications, and/or other communications. Communications may be received and entered by the users via their respective client computing platform(s) 106. Communications may be routed to and from the appropriate users through space server(s) 104 (e.g., through space module 110) and/or individual ones of platform server(s) 102.

The social graph access module 112 may be configured to facilitate accessing social graph information associated with individual virtual environments provided by platform server(s) 102. The social graph information may be accessed via the virtual space provided by space module 110. Generally speaking, a social graph may be viewed as a mapping of relationships (e.g., personal, professional, familial, and/or other relationships) between users associated directly and/or indirectly with a given virtual environment. According to some implementations, social graph information associated with a given virtual environment may include one or more of friends, contacts, relationship type, relationship duration, relationships in common, and/or other information included in a social graph of the given virtual environment. Social graph information associated with a given virtual environment may be used within the virtual environment provided by space module 110. Accessing social graph information associated with a given virtual environment may include interfacing between the virtual space API and the platform API associated with the platform providing the given virtual environment.

The platform mechanics module 114 may be configured to facilitate interacting with platform mechanics associated with individual virtual environments provided by platform server(s) 102. The platform mechanics may be interacted with via the virtual space provided by space module 110. Platform mechanics may be viewed generally as constructs of rules and/or functions of a virtual environment. In some implementations, platform mechanics associated with a given virtual environment may include one or more of invitations, requests, alerts, gifts, events, and/or other mechanics of the given virtual environment. Platform mechanics associated with a given virtual environment may be used within the virtual environment provided by space module 110. Interacting with platform mechanics associated with a given virtual environment may include interfacing between the virtual space API and the platform API associated with the platform providing the given virtual environment.

The platform publishing module 116 may be configured to facilitate transferring publishing information between the virtual space and individual virtual environments provided by platform server(s) 102. Publishing information may be viewed as information provided by a user that persists within the virtual environment and is viewable and/or otherwise accessible by one or more users. In accordance with some implementations, publishing information associated with a given virtual environment provided by a given platform may include one or more of textual messages, emails, voice-based communications, video-based communications, wall posts, and/or other publishing information. Publishing information associated with a given virtual environment may be used within the virtual environment provided by space module 110. Transferring publishing information between the virtual space and a given virtual environment may include interfacing between the virtual space API and the platform API associated with the platform providing the given virtual environment.

In some implementations, individual platform server(s) 102 may comprise electronic storage, one or more processors, and/or other components. For example, platform server(s) 102 may include communication lines, or ports to enable the exchange of information with a network and/or other computing platforms. The processors may be configured to execute computer program modules to provide one or more virtual environments to users via client computing platform(s) 106. The processors may be configured to execute the computer program modules via one or more of hardware, software, and/or firmware. Although system 100 may be described in certain sections herein as including platform server(s) 102, this is not intended to be limiting. The platform server(s) 102 may be separate and distinct from system 100, and may be provided by an entity that is separate from, for example, the entity providing space server(s) 104. In some implementations, some or all of the functionality attributed herein to platform server(s) 102 may be provided by space server(s) 104.

As used herein, a "virtual environment" may include a virtual space, one or more interactive, electronic social media, and/or other virtual environments. Exemplary virtual spaces are described herein. Interactive, electronic social media may include one or more of a social network, a virtual space, a micro-blogging service, a blog service (or host), a browser-based game, a multi-player mobile game, a file (e.g., image file, video file, and/or other files) sharing service, a messaging service, a message board, a forum, and/or other electronically distributed media that are scalable and enable interaction between the users. Some non-limiting specific examples of interactive, electronic social media may include the micro-blogging service provided by Twitter™, the social network provided by Facebook™, the social network provided by Google+™, the social network provided by MySpace™, the social network provided by Foursquare®, the virtual world provided by SecondLife®, the massively multi-player online game provided by World of Warcraft®, the file sharing service provided by Flickr®, Blogger, YouTube, PlayStation® Home, Xbox® Live, and/or other interactive electronic social media.

A given client computing platform 106 may include one or more processors configured to execute computer program modules. The computer program modules may be configured to enable an expert or user associated with the given client computing platform 106 to interface with system 100 and/or external resources 118, and/or provide other functionality attributed herein to client computing platform(s) 106. By way of non-limiting example, the given client computing platform 106 may include one or more of a desktop computer, a laptop computer, a handheld computer, a NetBook, a Smartphone, a gaming console, and/or other computing platforms.

The external resources 118 may include sources of information, hosts and/or providers of virtual environments outside of system 100, external entities participating with system 100, and/or other resources. In some implementations, some or all of the functionality attributed herein to external resources 118 may be provided by resources included in system 100.

The space server(s) 104 may include electronic storage 120, one or more processors 122, and/or other components. The space server(s) 104 may include communication lines, or ports to enable the exchange of information with a network and/or other computing platforms. Illustration of space server(s) 104 in FIG. 1 is not intended to be limiting. The space server(s) 104 may include a plurality of hardware, software, and/or firmware components operating together to provide the functionality attributed herein to space server(s) 104. For example, space server(s) 104 may be implemented by a cloud of computing platforms operating together as space server(s) 104.

Electronic storage 120 may comprise electronic storage media that electronically stores information. The electronic storage media of electronic storage 120 may include one or both of system storage that is provided integrally (i.e., substantially non-removable) with space server(s) 104 and/or removable storage that is removably connectable to space server(s) 104 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 120 may include one or more virtual storage resources (e.g., cloud storage, a virtual private network, and/or other virtual storage resources). Electronic storage 120 may store software algorithms, information determined by processor(s) 122, information received from platform server(s) 102, information received from client computing platform(s) 106, and/or other information that enables space server(s) 104 to function as described herein.

Processor(s) 122 is configured to provide information processing capabilities in space server(s) 104. As such, processor(s) 122 may include one or more of a digital processor, an analog processor, a digital circuit designed to process information, an analog circuit designed to process information, a state machine, and/or other mechanisms for electronically processing information. Although processor(s) 122 is shown in FIG. 1 as a single entity, this is for illustrative purposes only. In some implementations, processor(s) 122 may include a plurality of processing units. These processing units may be physically located within the same device, or processor(s) 122 may represent processing functionality of a plurality of devices operating in coordination. The processor(s) 122 may be configured to execute modules 108, 110, 112, 114, 116, and/or other modules. The processor(s) 122 may be configured to execute modules 108, 110, 112, 114, and/or 116 by software; hardware; firmware; some combination of software, hardware, and/or firmware; and/or other mechanisms for configuring processing capabilities on processor(s) 122.

It should be appreciated that although modules 108, 110, 112, 114, and 116 are illustrated in FIG. 1 as being co-located within a single processing unit, in implementations in which processor(s) 122 includes multiple processing units, one or more of modules 108, 110, 112, 114, and/or 116 may be located remotely from the other modules. The description of the functionality provided by the different modules 108, 110, 112, 114, and/or 116 described herein is for illustrative purposes, and is not intended to be limiting, as any of modules 108, 110, 112, 114, and/or 116 may provide more or less functionality than is described. For example, one or more of modules 108, 110, 112, 114, and/or 116 may be eliminated, and some or all of its functionality may be provided by other ones of modules 108, 110, 112, 114, and/or 116. As another example, processor(s) 122 may be configured to execute one or more additional modules that may perform some or all of the functionality attributed below to one or more of modules 108, 110, 112, 114, and/or 116.

Figure 2:
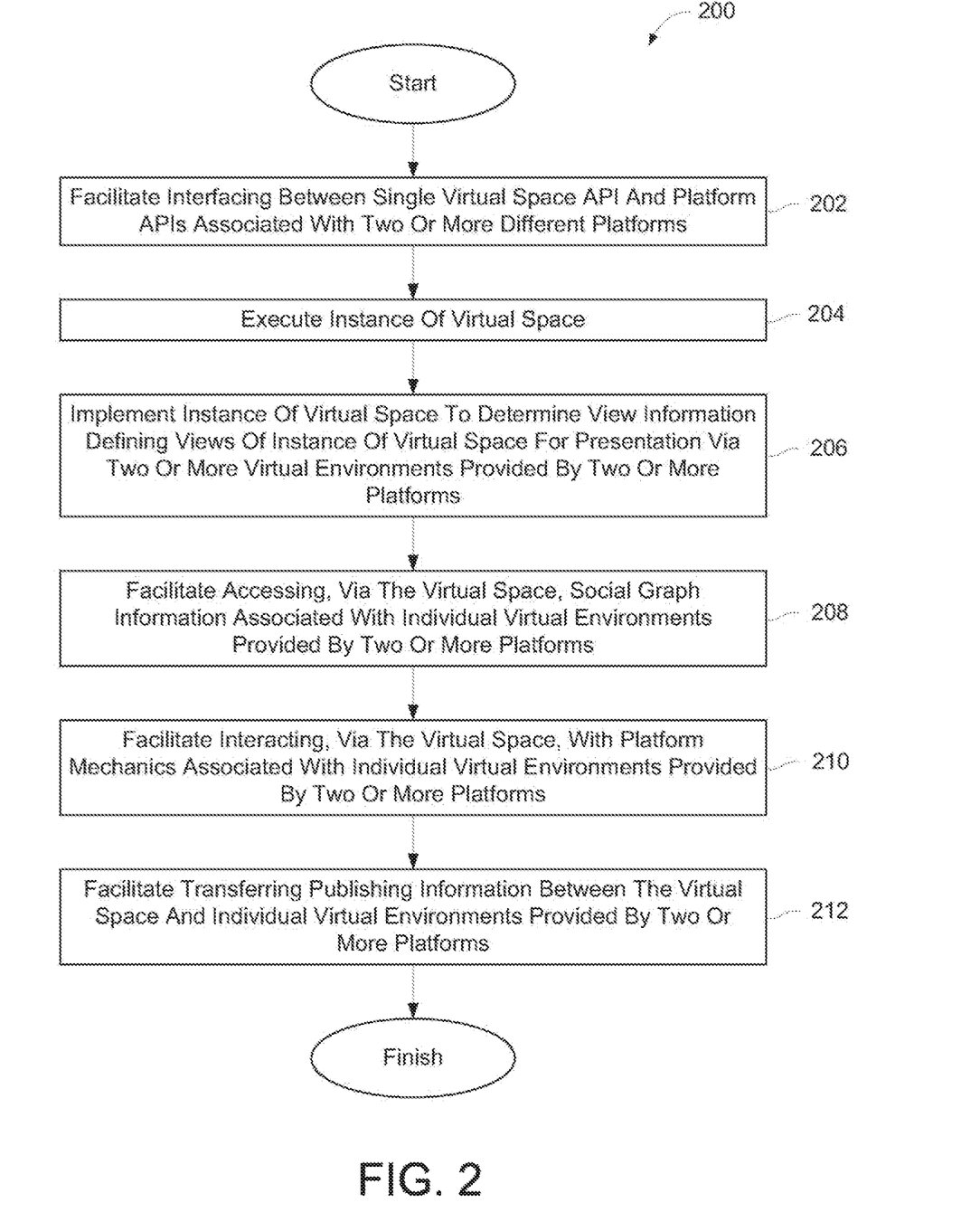
FIG. 2 illustrates a method of facilitating presentation of a virtual space within a plurality of virtual environments provided by different platforms without requiring idiosyncratic APIs associated with the virtual space for each different platform, in accordance with one or more implementations.

FIG. 2 illustrates a method 200 of facilitating presentation of a virtual space within a plurality of virtual environments provided by different platforms without requiring idiosyncratic APIs associated with the virtual space for each different platform, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, interfacing may be facilitated between a single virtual space API and platform APIs associated with two or more different platforms. Operation 202 may be performed by an API adaptor module that is the same as or similar to API adaptor module 108, in accordance with one or more implementations.

At an operation 204, an instance of a virtual space may be executed. Operation 204 may be performed by a space module that is the same as or similar to space module 110, in accordance with one or more implementations.

At an operation 206, the instance of the virtual space may be implemented to determine view information defining views of the instance of the virtual space for presentation via two or more virtual environments provided by the two or more platforms. Facilitating user interactions with the virtual space via a given virtual environment provided by a given platform may include interfacing between the virtual space API and the platform API associated with the given platform. Operation 206 may be performed by a space module that is the same as or similar to space module 110, in accordance with one or more implementations.

At an operation 208, accessing, via the virtual space, social graph information associated with individual virtual environments provided by the two or more platforms may be facilitated. Accessing social graph information associated with a given virtual environment may include interfacing between the virtual space API and the platform API associated with the platform providing the given virtual environment. Operation 208 may be performed by a social graph access module that is the same as or similar to social graph access module 112, in accordance with one or more implementations.

At an operation 210, interacting, via the virtual space, with platform mechanics associated with individual virtual environments provided by the two or more platforms may be facilitated. Interacting with platform mechanics associated with a given virtual environment may include interfacing between the virtual space API and the platform API associated with the platform providing the given virtual environment. Operation 210 may be performed by a platform mechanics module that is the same as or similar to platform mechanics module 114, in accordance with one or more implementations.

At an operation 212, transferring publishing information may be facilitated between the virtual space and individual virtual environments provided by the two or more platforms. Transferring publishing information between the virtual space and a given virtual environment may include interfacing between the virtual space API and the platform API associated with the platform providing the given virtual environment. Operation 212 may be performed by a platform publishing module that is the same as or similar to platform publishing module 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate presentation of an online application within a plurality of virtual environments provided by different platforms without requiring idiosyncratic APIs associated with the application for the different platforms, the system comprising:
one or more processors configured by machine-readable instructions to:
facilitate interfacing between a single online application API and platform APIs, wherein individual ones of the platform APIs corresponding to one or more platforms server that provide a virtual environment associated with the platform; and output information associated with the single online application API through the single online application API;

wherein facilitating interfacing between the single online application API and the platform APIs includes translating the information output through the single online application API to information specific to the platform APIs, and facilitating presentation of views of the online application that reflect the information output though the single online application API within a virtual environment provided by one of the different platforms such that presentation of the online application within the plurality of virtual environments provided by the different platforms is facilitated without requiring idiosyncratic APIs associated with the application for individual ones of the different platforms.

2. The system of claim 1, wherein the one or more processors are configured by machine-readable instructions to facilitate proper display of an interface for the online application within virtual environments provided by the different platforms.

3. The system of claim 1, wherein the one or more processors are configured by machine-readable instructions to facilitate interfacing between the single online application API and a first platform API, and between the single online application API and a second platform API.

4. The system of claim 1, wherein the one or more processors are configured by machine-readable instructions to facilitate accessing, via the online application, social graph information associated with individual virtual environments provided by the different platforms, wherein accessing social graph information associated with a first virtual environment includes interfacing between the single online application API and a first platform API, and wherein accessing social graph information associated with a second virtual environment includes interfacing between the single online application API and a second platform API.

5. The system of claim 4, wherein social graph information associated with a given virtual environment includes one or more of friends, contacts, relationship type, relationship duration, or relationships in common.

6. The system of claim 1, wherein the one or more processors are configured by machine-readable instructions to facilitate interacting, via the online application, with platform mechanics associated with individual virtual environments provided by the different platforms, wherein interacting with platform mechanics associated with a first virtual environment includes interfacing between the single online application API and a first platform API, and wherein interacting with platform mechanics associated with a second virtual environment includes interfacing between the single online application API and the second platform API.

7. The system of claim 6, wherein platform mechanics associated with a given virtual environment provided by a given platform include one or more of invitations, requests, alerts, gifts, or events.

8. The system of claim 1, wherein the one or more processors are configured by machine-readable instructions to facilitate transferring publishing information between the online application and individual virtual environments provided by the different platforms, wherein transferring publishing information between the online application and a first virtual environment includes interfacing between the single online application API and a first platform API, and wherein transferring publishing information between the online application and a second virtual environment includes interfacing between the single online application API and a second platform API.

9. The system of claim 8, wherein publishing information associated with a given virtual environment provided by a given platform includes one or more of textual messages, emails, voice-based communications, video-based communications, or wall posts.

10. A computer-implemented method of facilitating presentation of an online application within a plurality of virtual environments provided by different platforms without requiring idiosyncratic APIs associated with the online application for the different platforms, the method being implemented in a computer system comprising one or more processors configured by machine-readable instructions, the method comprising:

facilitating interfacing between a single online application API and platform APIs, wherein individual ones of the platform APIs corresponding to one or more platforms server that provide a virtual environment associated with the platform;

output information associated with the single online application API through the single online application API;

wherein facilitating interfacing between the single online application API and the platform APIs includes translating the information output through the single online application API to information specific to the platform APIs, and facilitating presentation of views of the online application that reflect the information output though the single online application API within a virtual environment provided by one of the different platforms such that presentation of the online application within the plurality of virtual environments provided by the different platforms is facilitated without requiring idiosyncratic APIs associated with the application for individual ones of the different platforms.

11. The method of claim 10, further comprising facilitating proper display of an interface for the online application within virtual environments provided by the different platforms.

12. The method of claim 10, wherein facilitating interfacing between the single online application API and platform APIs associated with two or more different platforms includes:

facilitating interfacing between the single online application API and a first platform API; and facilitating interfacing between the single online application API and a second platform API.

13. The method of claim 10, further comprising facilitating accessing, via the online application, social graph information associated with individual virtual environments provided by the different platforms, wherein accessing social graph information associated with a first virtual environment includes interfacing between the single online application API and a first platform API, and wherein accessing social graph information associated with a second virtual environment includes interfacing between the single online application API and a second platform API.

14. The method of claim 13, wherein social graph information associated with a given virtual environment includes one or more of friends, contacts, relationship type, relationship duration, or relationships in common.

15. The method of claim 10, further comprising facilitating interacting, via the single online application, with platform mechanics associated with individual virtual environments provided by the different platforms, wherein interacting with platform mechanics associated with a first virtual environment includes interfacing between the single online application API and a first platform API, and wherein interacting with platform mechanics associated with a second virtual environment includes interfacing between the single online application API and the second platform API.

16. The method of claim 15, wherein platform mechanics associated with a given virtual environment provided by a given platform include one or more of invitations, requests, alerts, gifts, or events.

17. The method of claim 10, further comprising facilitating transferring publishing information between the online application and individual virtual environments provided by the different platforms, wherein transferring publishing information between the online application and a first virtual environment includes interfacing between the single online application API and a first platform API, and wherein transferring publishing information between the online application and a second virtual environment includes interfacing between the single online application API and a second platform API.

18. The method of claim 17, wherein publishing information associated with a given virtual environment provided by a given platform includes one or more of textual messages, emails, voice-based communications, video-based communications, or wall posts.

* * * * *